United States Patent [19]

Ehrlinger et al.

[11] 4,275,616
[45] Jun. 30, 1981

[54] HYDRAULIC WHEEL DRIVE

[75] Inventors: Friedrich Ehrlinger; Egon Mann; Manfred Fischer, all of Friedrichshafen; Rudolf Jocham, Langenargen, all of Fed. Rep. of Germany

[73] Assignee: Zahnradfabrik Friedrichshafen AG, Friedrichshafen, Fed. Rep. of Germany

[21] Appl. No.: 948,233

[22] Filed: Oct. 3, 1978

[30] Foreign Application Priority Data

Oct. 6, 1977 [DE] Fed. Rep. of Germany ....... 2744936

[51] Int. Cl.³ .................. F16H 47/00; B60K 1/00; F16H 1/28
[52] U.S. Cl. .................... 74/730; 74/750 R; 74/801; 180/65 F; 180/308; 192/85 AA
[58] Field of Search ............ 180/308, 65 F, 253; 74/750 R, 801, 705, 730; 192/85 AA

[56] References Cited

U.S. PATENT DOCUMENTS

| | | | |
|---|---|---|---|
| 1,124,834 | 1/1915 | Bartsch | 74/705 |
| 2,213,111 | 8/1940 | Strout | 192/85 AA |
| 2,222,814 | 11/1940 | Hodges | 74/705 |
| 2,759,374 | 8/1956 | Bowman et al. | 74/750 R |
| 2,941,423 | 6/1960 | Armington et al. | 74/801 |
| 3,190,421 | 6/1965 | Schultz | 192/85 AA |
| 3,426,620 | 2/1969 | Pleska | 74/705 |
| 3,439,766 | 4/1969 | Dence et al. | 180/308 |
| 3,443,655 | 5/1969 | Beck et al. | 180/253 X |
| 3,452,612 | 7/1969 | Casey | 180/70 R X |
| 3,477,547 | 11/1969 | Kress et al. | 180/70 R X |
| 3,686,978 | 8/1972 | Knoblach et al. | 74/801 |
| 3,831,762 | 8/1974 | Schultz | 192/85 AA |
| 3,865,207 | 2/1975 | Schwab | 180/44 F |
| 3,944,007 | 3/1976 | Thom et al. | 180/308 X |
| 3,954,026 | 5/1976 | Rittmann et al. | 180/308 X |
| 4,040,312 | 8/1977 | Tappan et al. | 74/801 |
| 4,142,615 | 3/1979 | Sidles, Jr. | 180/70 R |
| 4,162,713 | 7/1979 | Heitman | 180/308 X |

FOREIGN PATENT DOCUMENTS

| | | | |
|---|---|---|---|
| 247220 | 5/1963 | Australia | 180/65 F |
| 450241 | 8/1948 | Canada | 192/85 AA |
| 450242 | 8/1948 | Canada | 192/85 AA |
| 2548473 | 5/1976 | Fed. Rep. of Germany . | |
| 143796 | 11/1930 | Switzerland | 74/705 |
| 337744 | 11/1930 | United Kingdom | 74/705 |
| 1239743 | 7/1971 | United Kingdom | 180/253 |
| 1247566 | 9/1971 | United Kingdom . | |
| 1347192 | 2/1974 | United Kingdom | 180/65 F |

Primary Examiner—Leslie Braun
Attorney, Agent, or Firm—Karl F. Ross

[57] ABSTRACT

A wheel drive comprises a hollow wheel support having a projection and in which is housed an axial-piston hydraulic motor having an output shaft connected via planetary gearing to the hub. To this end the projection is provided with mounting pins constituting the planet carrier of a first set of planet gears which mesh with a ring gear formed integrally inside the hub and with a sun gear that may be provided directly on the motor output shaft or that may be the output of a second set of planetary gears whose planet gears mesh with the ring gear of the hub and whose sun gear is connected to the motor output shaft. A clutch can be provided on this motor output shaft to disconnect it from the respective sun gear, and the inner end of the motor shaft may be acted on by a wheel brake.

12 Claims, 3 Drawing Figures

HYDRAULIC WHEEL DRIVE

FIELD OF THE INVENTION

The present invention relates to a hydraulic wheel drive. More particularly this invention concerns such a drive used directly in the wheels of a piece of construction equipment or the like.

BACKGROUND OF THE INVENTION

A wheel drive such as used in construction equipment normally comprises a hydraulic motor that is mounted in the hub, and a planetary-gear transmission connected between this motor and the body of the motor vehicle. Normally a relatively long axial spacing must be provided between the motor and the transmission.

Such an arrangement is also associated with a brake that must engage directly on the wheel hub or on an element jointly rotatable therewith. Thus the brake for such an arrangement must be able to stop the vehicle by exerting considerable force. Such a brake is normally a relatively bulky and heavy-duty unit.

Another disadvantage of these units is that when the vehicle is operated at road speeds, either when driving itself or when being towed, the motors are operated pump-fashion at high speed. Even when the inputs and outputs of the motors are connected together to reduce resistance, this type of operation results in considerable strain on the motors and consequently greatly decreases their service life.

OBJECTS OF THE INVENTION

It is therefore an object of the present invention to provide and improved wheel drive.

Another object is to provide such a drive which is extremely compact so that it can be built into the wheel of even a relatively small vehicle.

A further object is to provide such an arrangement which will have a longer service life than the hitherto known types, and which will not be subject to excessive wear when operated at relatively high road speeds.

SUMMARY OF THE INVENTION

These objects are attained according to the instant invention in a wheel drive wherein the hydraulic motor is mounted inside a projection formed directly on the wheel support. The wheel hub in turn is rotatable on this projection, and planetary gearing is provided between the motor and the wheel hub.

Such an arrangement can be made extremely compact, that is of extremely short axial length. It can be made so small that the provision of such a wheel drive inside even a guided wheel will not add excessive weight to the wheel assembly.

According to further features of this invention the motor is of the axial-piston type and has a rotor having an output shaft that extends outwardly from the projection on the wheel support. This shaft is connected to a sun gear that meshes with at least one planet gear carried on a mounting pin extending axially and outwardly from the projection. The planet gear in turn meshes with a ring gear formed integrally on the inner wall of the generally tubular wheel hub. Thus the wheel hub itself forms a member of the planetary-gear transmission so that the size of the drive can be reduced to a minimum.

The above-mentioned sun gear may be connected to the ring gear formed in the wheel hub by means of a complete set of planetary gearing. To this end the output shaft is connected to a second sun gear meshing with a plurality of second planet gears also meshing with the ring gear formed on the inside of the hub. These second planet gears are themselves mounted on a planet carrier that is directly rotationally coupled to the first-mentioned sun gear that meshes with the planet gears carried on the support itself. In this manner two-stage planetary gearing can be provided in an extremely short distance so that a low-torque high-speed axial motor can be employed.

According to another feature of this invention the output shaft extends axially through the support frame and is provided on its inner end with a disk or drum brake. As this member is effective through a step-down transmission on the wheel hub itself, the brake can be of the low-torque type and can be correspondingly lightly dimensioned.

In accordance with yet another feature of this invention the output shaft ofd the motor is connected via a clutch to the sun gear, and preferably via a second set of planetary gears also. This clutch can be pressurized through a passage extending axially through the shaft of the motor, and a clutch element carried fixedly on this motor shaft and always rotatable therewith includes a pressurizable cylinder that operates the clutch. This type of system allows the motor to be disconnected completely from the wheel, so that during high-speed travel the motor can remain at a standstill. As a result the service life of the motor will be increased considerably, and there will be no necessity of providing elaborate shunting arrangements to unload the motor during high-speed operation.

SPECIFIC DESCRIPTION

Figure 1:
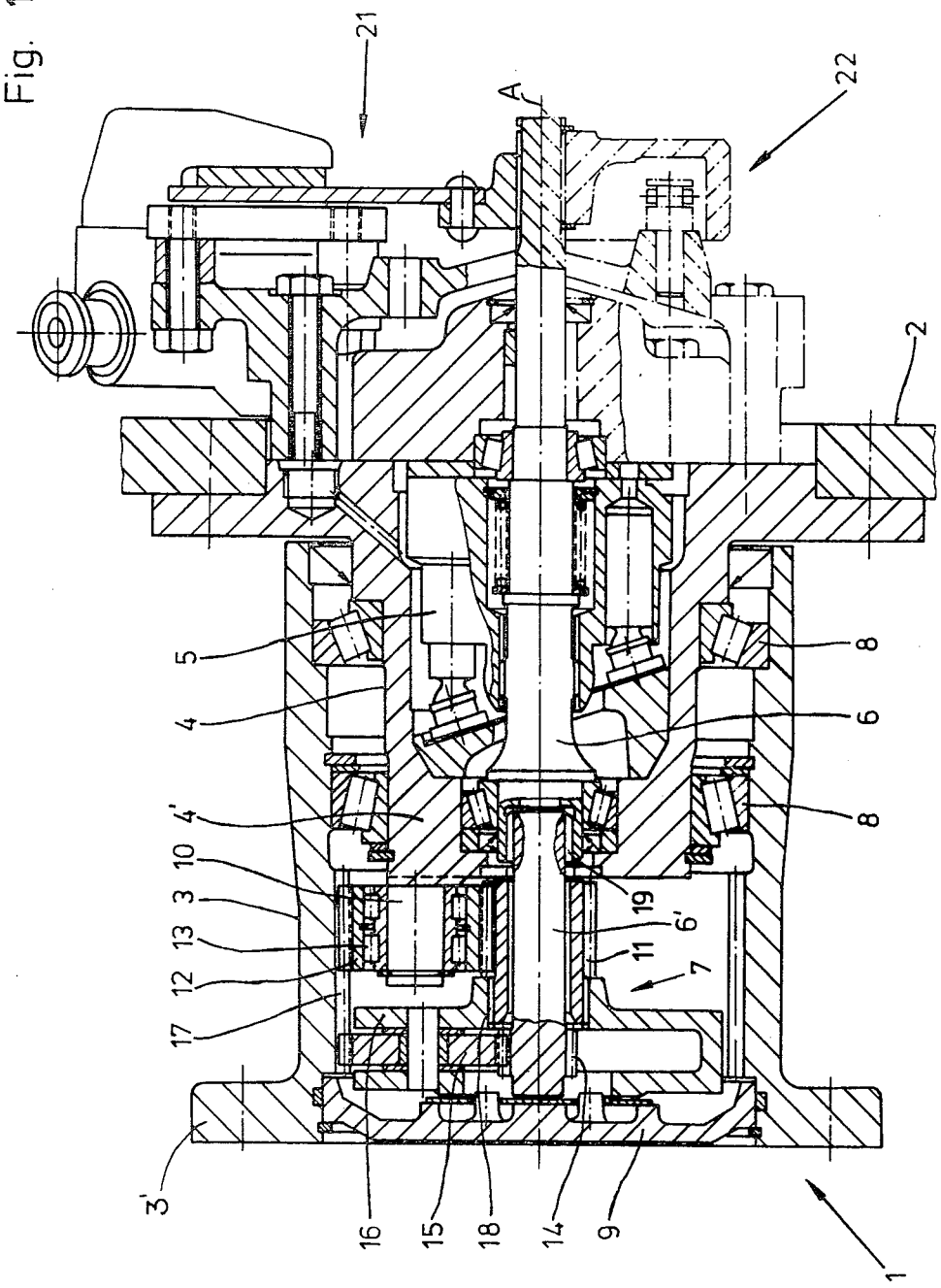
FIG. 1 is an axial section through a wheel drive according to the instant invention.

As shown in FIG. 1 a wheel drive 1 according to the instant invention basically comprises a hollow hub support 4 mounted on the fixed vehicle frame 2 and rotatably supporting a tubular wheel hub 3 by means of two sets of roller bearings 8. The vehicle wheel is bolted to the flange 3' of the hub 3. The hub support 4 has a projection 4' which is hollow and in which is received an axial-piston motor 5 having a motor shaft 6 effective through a planetary-gear transmission 7 on the hub 3. A cover plate 9 constituting an end wall of the hub 3 is releasably secured therein and extends generally perpendicular to an axis A on which the tubular hub 3 is centered along with the shaft 6.

The projection 4' of the hub support 4 is provided with three angularly equispaced and axially extending mounting pins 10 each of which carries via roller bearings 13 a respective planet gear 12. The inside of the tubular hub 3 is formed with an array of ring-gear teeth 17 with which the planet gears 12 mesh.

The shaft 6 is splined to a shaft extension 6' formed with a sun gear 14 that meshes with a plurality of second planet gears 15 carried on a planet carrier 16 in turn connected via splines 18 to a sun gear 11 which is rotatable on the shaft extension 6' and which meshes with the first planet gears 12. The second planet gears 15 also mesh with the ring-gear teeth 17 of the hub 3.

The shaft 6 has an inner end which extends through the motor-vehicle frame 2 and which is acted on by either a disk brake 21 or a drum brake 22.

Figure 2:
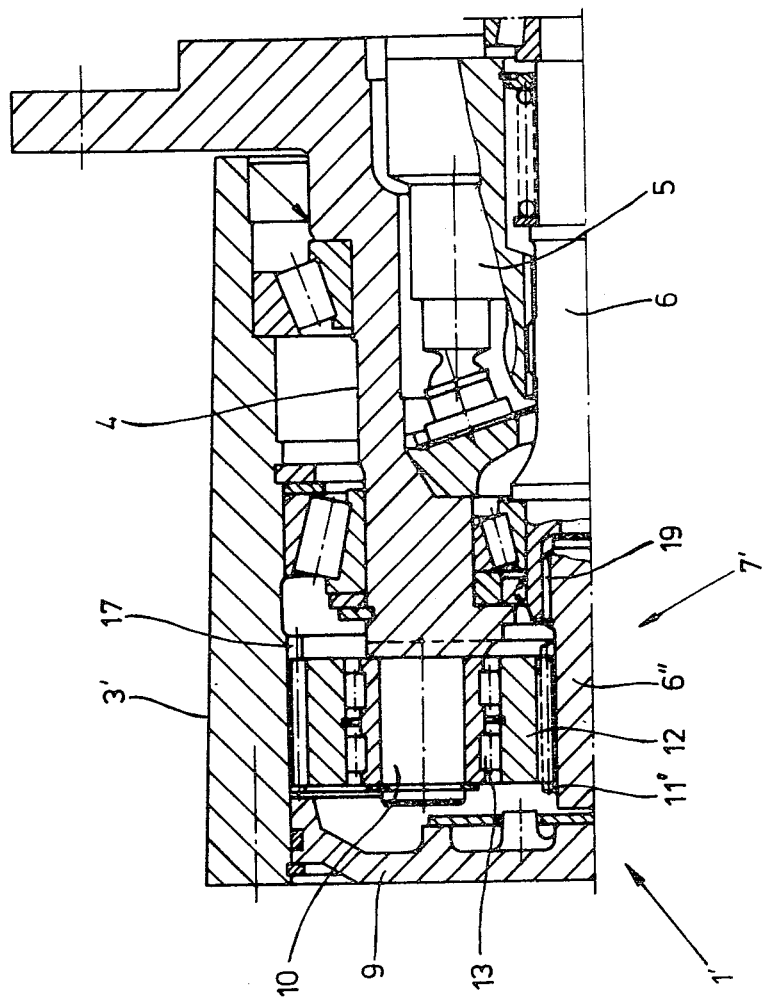
FIG. 2 is an axial section through a detail of another wheel drive according to this invention.

It is possible as shown in FIG. 2 to dispense with the second sun gear 14, second planet gears 15, and second planet carrier 16 and to form a sun gear 11' directly on a short extension 6" connected via splines 19 to the shaft 6. Such a system will have an extremely short axial length, but will have a smaller step down than the transmission 7 of FIG. 1.

Figure 3:
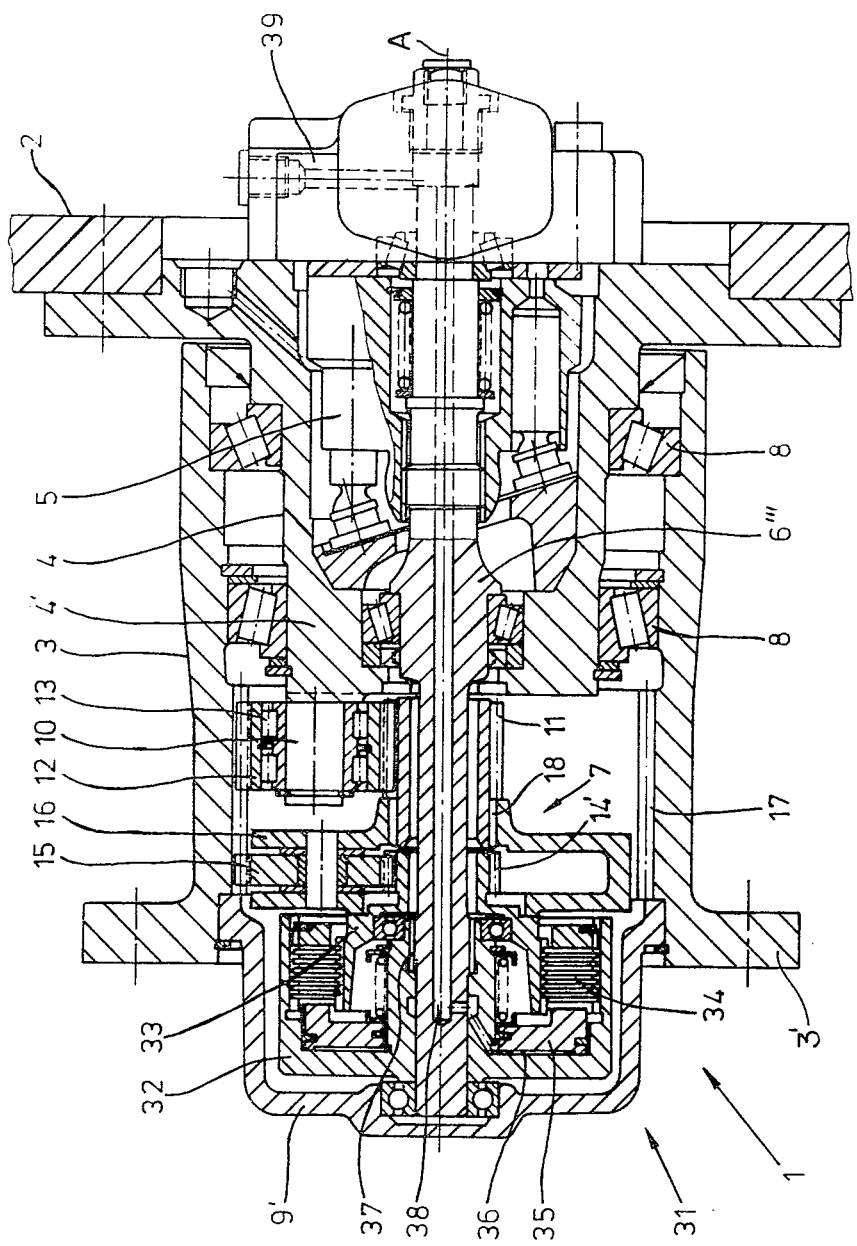
FIG. 3 is an axial section through yet another wheel drive according to the present invention.

It is also possible as shown in FIG. 3 to replace the flat plate 9 with a cupped cover plate 9' and to employ a single relatively long output shaft 6''' for the motor 5. The outer end of this shaft 6''' for the motor 5. The outer end of this shaft 6''' carries a clutch 31 that can connect this shaft 6''' to a sun gear 14' functionally identical to the sun gear 14 of FIG. 1.

The clutch 31 comprises a first clutch element 32 connected via splines 37 to the shaft 6''' and a second clutch element 33 unitary with the second gun gear 14'. A piston 35 can be displaced against a pack 34 of clutch disks to lock the two members 32 and 33 rotationally together. To achieve this a fluid-supply arrangement 39 is connected inside the frame 2 of the vehicle with a passage 38 extending axially through the shaft 6''' and opening into the chamber 36 behind the piston 35.

This clutch arrangement has the considerable advantage that a clutch that transmits relatively limited torque can be used to connect the motor 5 to the hub 3, as it is provided at the input side of the transmission 7. Similarly this clutch can be energized from inside the frame but serviced from outside the vehicle, simply by removing the cap 9'. During high-speed road travel the clutch 31 can be opened so that the hub 3 will merely drive the planetary-gear transmission 7, but will not turn the rotor of the motor 5.

We claim:

1. A wheel drive comprising:
   a generally nonrotatable wheel support having a hollow projection;
   a hydraulic motor mounted on said support at least partially in said projection and having an outwardly directed output shaft having an outer end;
   a wheel hub supported solely and rotatable on said projection about a wheel axis, having an open outer side turned away from said motor, and formed internally with axially elongated teeth forming a ring gear centered on said axis;
   an end plate extending generally perpendicular to said axis and releasably secured to said hub over said open outer side thereof, said plate forming at said axis a journal for said outer end of said output shaft;
   at least one mounting pin integral with said projection and extending therefrom parallel to but offset from said axis, said pin having an inner end fixed at said projection and a free outer end;
   a planet gear rotatable on said free end of said pin and meshing with said ring gear;
   a sun gear rotatable about and centered on said axis and meshing with said planet gear; and
   means operatively connecting said sun gear to said output shaft for driving said hub by said motor through said gears.

2. The wheel drive defined in claim 1 wherein said output shaft is centered on said axis, said means being formations rotationally coupling said sun gear directly to said output shaft.

3. The wheel drive defined in claim 2 wherein said formations are splines on said sun gear and on said output shaft.

4. The wheel drive defined in claim 1 wherein said motor is an axial-piston motor.

5. The wheel drive defined in claim 1, further comprising means on said support for braking said output shaft.

6. The wheel drive defined in claim 1 wherein said projection is largely hollow and said motor is substantially entirely inside said projection.

7. The wheel drive defined in claim 1 wherein said means includes:
   a planet carrier rotatable about said axis and fixed to said sun gear;
   a second such ring gear centered on said axis;
   a second such planet gear meshing with said second ring gear; and
   a second such sun gear rotatable about said axis and connected to said output shaft.

8. The wheel drive defined in claim 7 wherein both of said ring gears are integrally formed in said hub.

9. The wheel drive defined in claim 1 wherein said end plate is closely juxtaposed with the other end of said mounting pin for said planet gear.

10. The wheel drive defined in claim 1 wherein said means includes a clutch having:
    a first clutch member operatively rotatably connected to said sun gear; and
    means for pressing said members together and thereby rotationally linking said output shaft and said sun gear.

11. The wheel drive defined in claim 10 wherein said output shaft is formed with an at least partially axially extending passage, said means for pressing including fluid supply means connected through said passage to said members.

12. The wheel drive defined in claim 10 wherein said first clutch member is rotationally fixed on said shaft.

* * * * *